United States Patent
Ve Nard, II

[15] 3,638,094

[45] *Jan. 25, 1972

[54] POLYPHASE POWER INVERTER SYSTEM

[72] Inventor: Dan L. Ve Nard, II, Bonners Ferry, Idaho

[73] Assignee: Gates Learjet Corporation, Wichita, Kans.

[*] Notice: The portion of the term of this patent subsequent to Nov. 4, 1986, has been disclaimed.

[22] Filed: Oct. 21, 1969

[21] Appl. No.: 868,190

Related U.S. Application Data

[63] Continuation of Ser. No. 630,061, Nov. 4, 1969, Pat. No. 3,477,010.

[52] U.S. Cl. .............................321/5, 321/9 R, 321/27 MS, 321/DIG. 1
[51] Int. Cl. ..........................................H02m 1/12, H02m 7/52
[58] Field of Search ..........................321/5, 9, 27 SW, DIG. 1

[56] References Cited

UNITED STATES PATENTS

| | | | |
|---|---|---|---|
| 3,477,010 | 11/1969 | Ve Nard | 321/27 X |
| 3,521,148 | 7/1970 | Anderson et al. | 321/27 X |
| 3,523,236 | 8/1970 | Howell et al. | 321/9 |
| 3,391,323 | 7/1968 | Ikeda | 321/5 |
| 3,324,374 | 6/1967 | Corey | 321/5 |

Primary Examiner—William H. Beha, Jr.
Attorney—Richard A. Marsen

[57] ABSTRACT

Polyphase inverter system utilizing power silicon-controlled rectifiers. A plurality of polyphase square wave generators or channels are interconnected, each generator in a relative predetermined time phase displacement. Their respective outputs are herein arranged to directly provide multistepped waveforms, filtered to become the system polyphase power output. Each such waveform is composed of a significant number of steps whereby substantially reduced filtering is required. The generator channels are coupled in pairs, to respective delta and wye transformer arrangements, with their corresponding secondary windings in series-add summation, on a phase by phase basis. Reduced weight, bulk, and cost factors are significant, particularly for the summation transformers. Applicable for generating precise output frequency supply as 400-cycle polyphase aircraft installations, and for 60-cycle uninterrupted power ground stations.

11 Claims, 8 Drawing Figures

TWO CHANNEL 3∅ POWER INVERTER

INVENTOR,
DAN L. VENARD II
BY
Richard A. Marsen
ATTORNEY.

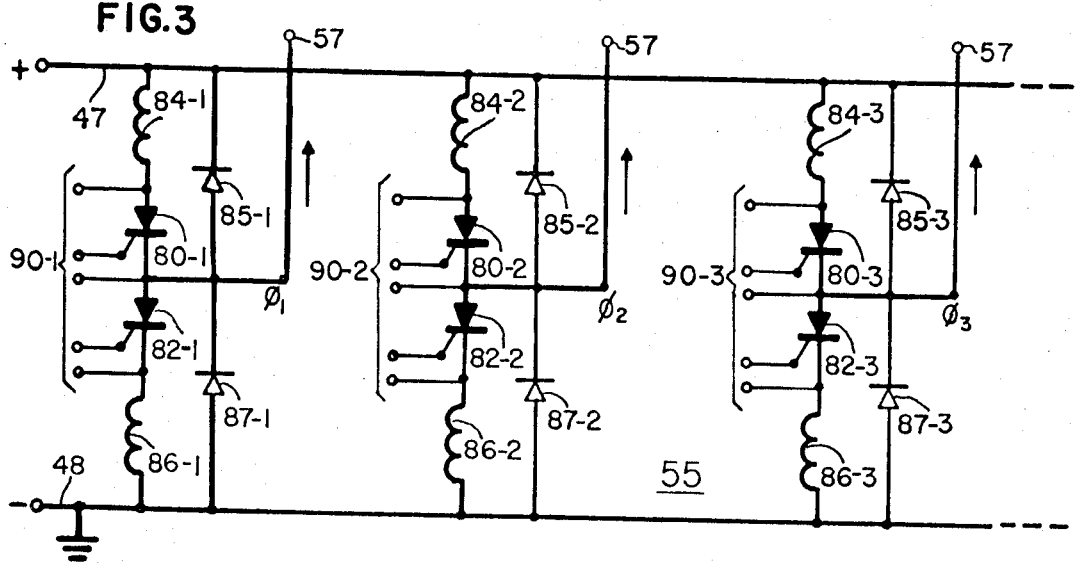
FIG. 3
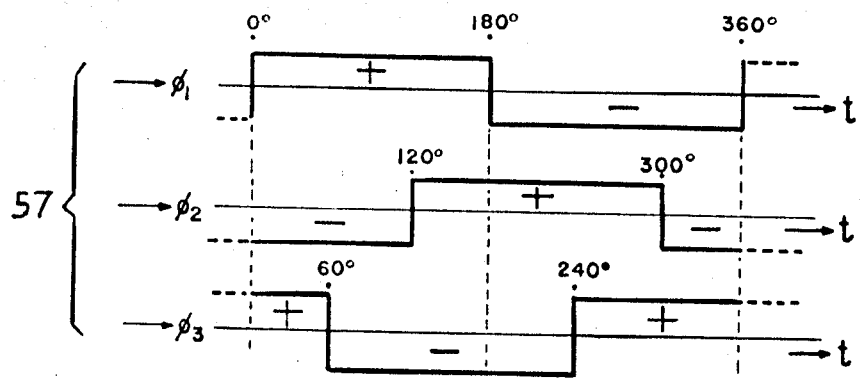
FIG. 4 SCR CONDUCTION TO PRIMARY OF ST-1 (3∅)
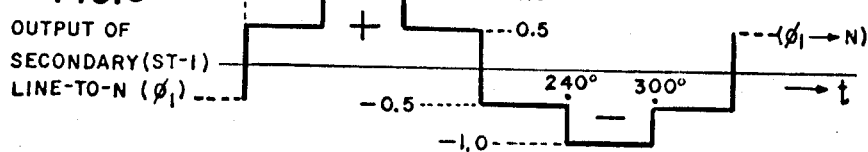
FIG. 5 OUTPUT OF SECONDARY (ST-1) LINE-TO-N (∅₁)
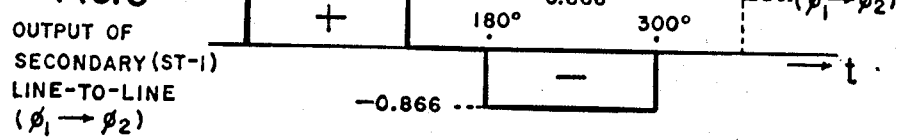
FIG. 6 OUTPUT OF SECONDARY (ST-1) LINE-TO-LINE (∅₁ → ∅₂)

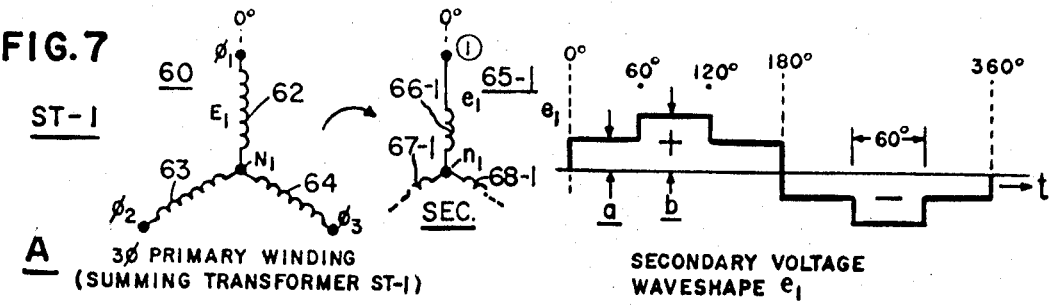
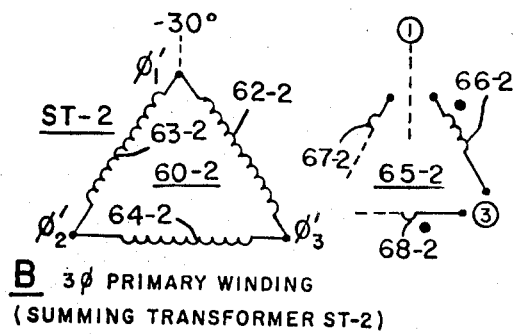
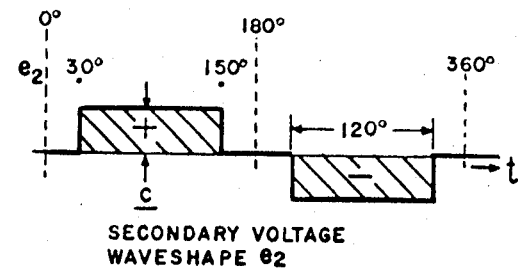
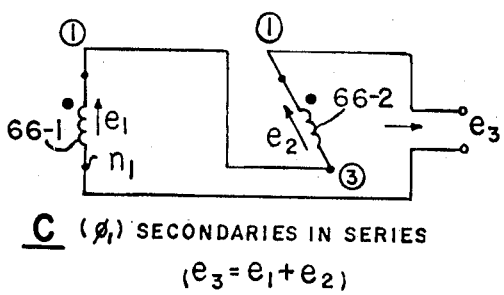
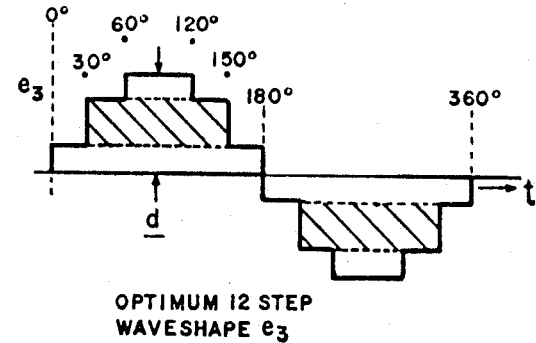
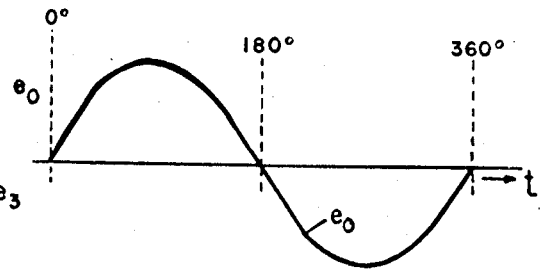
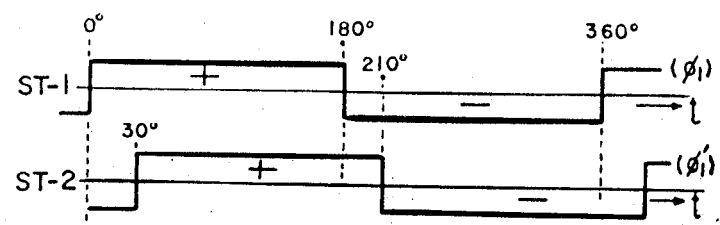

3,638,094

POLYPHASE POWER INVERTER SYSTEM

The present invention is an improvement and continuation-in-part of my copending application Ser. No. 630,061, that issued on Nov. 4, 1969 as U.S. Pat. No. 3,477,101, assigned to the assignee thereof.

As disclosed in said prior case, individual polyphase signal generators are utilized as building blocks to provide the rated power requirement for the inverter system. They are respectively energized by a direct current source, and produce currents of square waveform alternating at a cyclic rate that predetermines the output frequency. The increasing power ratings of available silicon-controlled rectifiers has expanded polyphase inverter applications to higher power installations. The plural interconnected square-wave generators hereof make significant power outputs practical.

Rather complex and inefficient arrangements were heretofore utilized, that required relatively large and heavy and costly filter inductors and capacitators. Further, they produced significant radio and magnetic radiation interference, were rather unreliable, and were heavy for airborne use.

In accordance with the present invention, square wave polyphase generators or channels are interconnected in pairs, with respective delta and wye output transformers. Efficient multistep polyphase waveforms are provided directly in the system output. The paired generator channels are respectively time-phase displaced in predetermined degree. The paired delta and wye-connected output transformer configurations hereof provide the advantageous respective waveforms, which as a result of their said time-phase displacement, mesh into composite multistep polyphase waveshapes. The respective stepped signal summations require a minimum of filtering, and thus cost and weigh considerably less.

More specifically, the delta-connected output transformer is constructed with its phase sections having more turns with an impedance that is the same as that presented by the wye-connected transformer to its polyphase associated square-wave generator. This insures equal power division between the channel pairs. Each primary winding of these transformers has a closely wound individual secondary winding. The respective turns ratios of the delta and wye arrangements hereof result in the same number of turns for each secondary winding. The secondary windings are connected in respective series-add relation, on a phase-by-phase basis between the channel pairs, providing the desired multistep waveforms for the polyphase system output. The delta and wye transformers are of conventional polyphase types, compared to specialized types often required heretofore.

BRIEF DESCRIPTION OF THE DRAWINGS

FIG. 3 is a schematic electrical diagram of a three-phase square wave generator-channel for the exemplary system.

FIG. 4 illustrates the square waveform voltage output of the generator of FIG. 3.

FIGS. 5 and 6 illustrate the waveform of respective signals appearing at the secondary windings of the wye-connected transformer.

FIG. 7 illustrates, in its sections A to D, the output waveform composite construction of the paired delta and wye channels per FIG. 2.

FIG. 8 illustrates the relative time-phase relationship of the square wave outputs of the channel pair of FIG. 2.

DETAILED DESCRIPTION OF THE INVENTION

Figure 1:
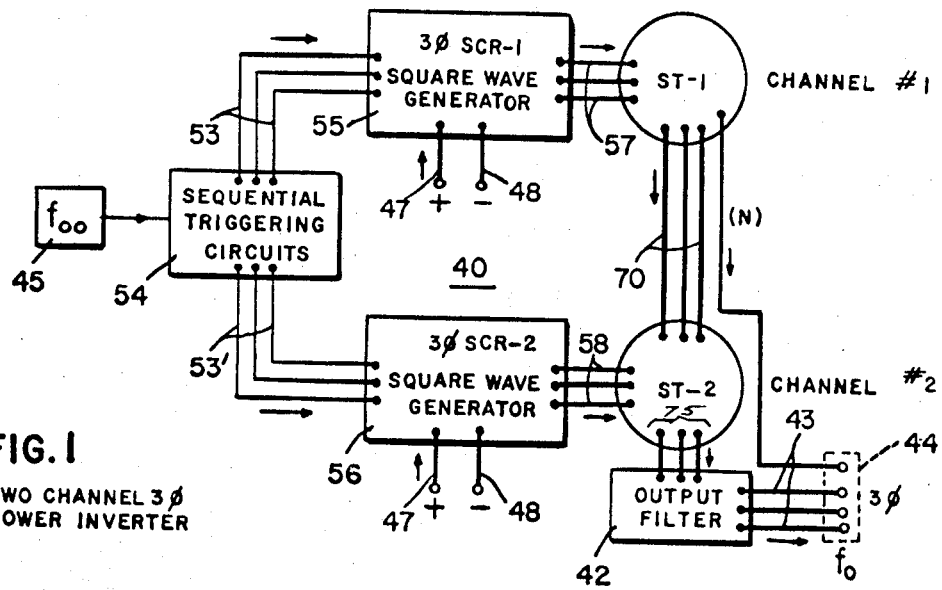
FIG. 1 is a block diagram of the exemplary polyphase inverter system.

FIG. 1 is a schematic diagram of a three-phase inverter (40) hereof, arranged in two channels. Channel No. 1 comprises square wave generator 55 that feeds into an associated output or summing transformer ST-1. Channel No. 2 comprises square wave generator 56 that feeds into its transformer ST-2. Both square wave generators 55, 56 are solid-state three-phase devices. They incorporate respective banks of silicon-controlled rectifiers arranged to provide properly timed and phase voltages of sizable magnitude to transformers ST-1 and ST-2. Operation of the SCR banks is effected by sequential triggering circuits 54, which in turn are controlled by base-frequency impulses ($f_{\infty}$) from unit 45. The triggering unit 54 is shown connected by cables 53, 53' to the generators 55,56. Exemplary circuits for units 55 and 56 are shown and described in connection with FIGS. 2 and 3.

The square wave generators (55,56) are powered by the direct current lines (47,48) from a suitable DC source. Their three-phase square wave outputs are respectively applied to the primary windings: of transformer ST-1 via leads 57; and of transformer ST-2 via leads 58. The transformers ST-1 and ST-2 each are of conventional three-phase configuration, and of stationary laminated iron construction. The secondary windings of output transformers ST-1 and ST-2 are interconnected, in series-add, providing optimum multistepped waveforms at the set system output frequency ($f_o$). Such connection is indicated by multiwire cable 70 between transformers ST-1 and ST-2 with optional fourth-wire neutral (N).

The summing transformers hereof (ST-1, ST-2), their electrical interrelation with each other and with the signals and circuits of the inverters, are significant and important to the effectiveness, flexibility, and efficiency of the present invention.

Figure 2:
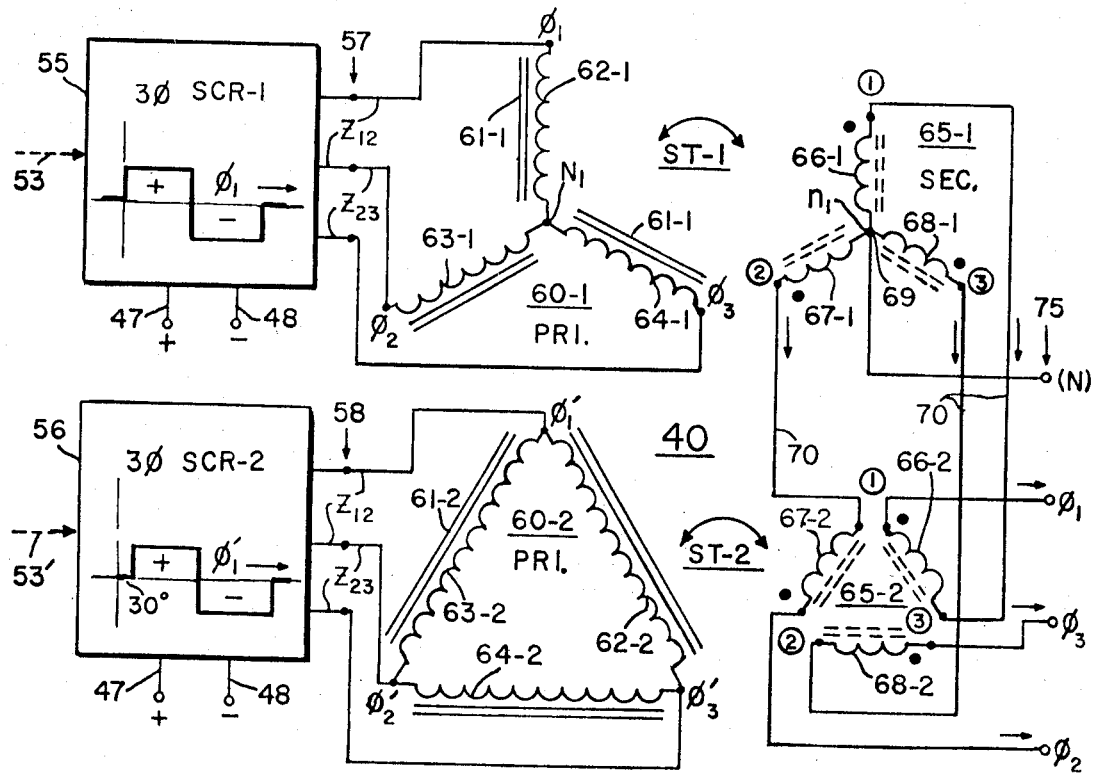
FIG. 2 is a schematic diagram of the paired channel delta and wye transformer interconnection, per the invention system.

The exemplary inverter system (40) is a two-channel three-phase configuration. The power inverters hereof, in their more general aspects, may contain any practical even number of channels, as multichannel inverters. Also, the number of electrical phases thereof is optional, as one-, two-, three- or six-phase output. The polyphase multichannel inverters provide improved efficiency and higher power ratings. A circuit representation of the reference summing transformer ST-1 of channel No. 1 is shown in FIG. 2. It has a laminated iron core 61-1 with a conventional polyphase physical configuration. Its primary 60-1 comprises three-phase windings 62-1,63-1,64-1 wound in conventional array, interphase coupled magnetically by core 61-1. The secondary 65-1 comprises individual three-phase windings 66,67,68 wound in space-phase with the respective primary windings 62-1,63-1,64-1. The secondary windings are preferably wound close to and upon their respective primary windings. The ST-1 transformer primary and secondary 60-1,65-1 thus comprises three phases: $\phi_1, \phi_2, \phi_3$.

The transformer ST-2 for channel No. 2 is connected in delta configuration at its primary 60-2. Also, importantly as well the time-phase of the square wave input from generator SCR-2 (56) to the respective primary windings 62-2,63-2,64-4 are displaced in a predetermined amount. For the two-channel embodiment 40, channel No. 2 signals are time-displaced 30° vs. No. 1. The result of such preset time-phase displacement yields in summation, output signals 75 of optimum stepped waveform construction as will be detailed hereinafter, particularly in connection with FIGS. 4 to 7.

Reference summing transformer ST-1 is shown with both its primary 6-1 and secondary 65-1 connected in wye configuration. The central or common terminal 69 of wye secondary 65 affords the neutral wire connection (N) for the three-phase four-wire output indicated at 75. Cable 70 connects the secondary windings of the summing transformers in particular series-add, as shown in FIG. 2, and explained in connection with FIGS. 7 and 10 for the two-channel version hereof. Balanced polyphase output signal summation occurs thereby, producing optimum stepped waveforms of relatively low distortion that are readily filtered effectively.

The square wave power fed by generator 55 to primary 60-1 of summing transformer ST-1 is graphically illustrated in FIG. 4. Each primary winding 62-1,63-1,64-1 is impressed by a square waveform voltage of alternate positive (+) and negative (−) components, each of 180° duration at the frequency of system output, namely $f_o$. With winding 62-1 as reference phase $\phi_1$; winding 63-1 is at phase $\phi_2$, impressed with square wave voltage that lags in time-phase by 120°, as shown; and winding 64-1 is at phase $\phi_3$, impressed with voltage that lags $\phi_1$ by 240°, and $\phi_2$ by 120°. The voltage induction to secondary 65-1 is on an effective square wave basis, as will now be described.

Apparatus for the generation of three-phase square wave power, per FIG. 4, may embody banks of transistors, silicon-controlled rectifiers, or gas-filled tubes. Exemplary SCR circuitry therefor is schematically shown in FIG. 3, and in more detail in my above-said patent. The invention inverter system requires an even number of pairs of such polyphase square voltage generators (as 40), with respective predetermined time-phase displacement between said channels for energizing the corresponding channels thereof. Thus, the two-channel embodiment 40 utilizes polyphase square wave power via cable 58 of paired generator 56 that is displaced by 30° in time-phase with respect to the reference three-phase counterpart from generator 55, for reasons to be set forth in connection with FIG. 7. Circuits for obtaining the requisite precise timing, triggering and commutating the SCR' thereof to provide the sequential input voltages are detailed in the said patent, and not part of this invention.

FIGS. 5 and 6 illustrate the resultant waveforms of the signals that appear at the secondary (65-1) output of transformer ST-1 when the aforesaid three-phase square wave voltages are applied to its primary (60-1) input. Induced in each channel No. 1 secondary windings 66-1, 67-1, 68-1 is a stepped waveform voltage. FIG. 5 illustrates its waveform output, at line-to-neutral-point 69. That across winding 66-1 (phase $\phi_1$) is in time-phase with the $\phi_1$ square wave input (FIG. 4), extending with (+) and (−) swings, each 180° long. The secondary phases $\phi_2$ and $\phi_3$ are correspondingly 120° and 240° time-phase displaced, as will now be understood by those skilled in the art. Each "step" of the FIG. 5 waves is 60° long, and 0.5 in relative magnitude Each such full wave over 360° is thus in eight steps, corresponding to one cycle for the $f_o$ output. The plateau peaks are at the relative magnitude 1.0 for the purpose of the subject presentation.

Such stepped output waveform results from the voltages induced by the polyphase transformer (ST-1) induction, due to the three-phase square wave input thereto (see FIG. 4). The corresponding line-to-line waveforms, as across lines $\phi_1$ to $\phi_2$ are shown in FIG. 6; its 0° time reference also being that of the phase $\phi_1$ input per FIG. 4. It is noted that this signal output ($\phi_1$ to $\phi_2$) is only of 120° duration for both its (+) and (−) sections, with 60° blanks or zero current and voltage therebetween. Further, its relative amplitude is 0.866 compared to the reference line-to-neutral waveform (FIG. 5). The waveform of the signal output between lines $\phi_2$ and $\phi_3$ is the same as between lines $\phi_1$ to $\phi_2$, except it lags 120° to coincide with input phase $\phi_2$; that between lines $\phi_3$ and $\phi_1$, being further behind by 120°.

It is understood that the polyphase square wave input voltages to the polyphase primaries of the summing transformers hereof (ST-1, ST-2) correspond to the idealized waveforms of FIG. 4. Although sharp rise square waveforms are illustrated, the invention system is also effective with input waveforms having rounded corners or with sloped rise-and-fall shape. Particular means for generating such polyphase square wave currents are optional, in utilizing the invention system. The three-phase square wave signal array shown in FIG. 4 corresponds to e.m.f. measurements from each output line (of cable 57) to a virtual or voltage midpoint of the generator (55), or to the opposite link during conduction, as is understood by those skilled in the art. The line-to-line voltage for secondary 65-1 is as shown in FIG. 6 on a three-phase basis however. 1 The magnitude of the secondary voltages depends upon the turns-ratio, primary (60-1) to secondary (65-), as will be set forth. Finally, the corresponding parameters of the polyphase outputs of the other square wave generator(s) in the system, are in time-phase displacement with respect to the base generator (55), as already indicated.

A typical polyphase square waveform generator (55) electrical circuit is schematically indicated in FIG. 3. Its three-phase voltage output at terminals 57 corresponds to the conduction curves of FIG. 4. The alternate firing of paired silicon-controlled power rectifiers 80-1, 82-1, 180° intervals, produces the output phase $\phi_1$; that of SCR' 80-2, 82-2: phase $\phi_2$; of SCR' 80-3, 82-3: phase $\phi_3$. Their respective inductors (as 84-1, 86-1) in series to the DC bus 47, 48 are part of their commutation circuitry, and also serve to moderate or soften the rate of reapplied voltage and current to the power SCR'. The shunt diodes 85-1, 87-1 etc., are for conducting reactive load currents back to the DC bus, as is well known. The respective circuitry for the cyclic gating ON and commutating or turning OFF of the SCR pairs 80-1, 82-1 etc., to produce their square waveform outputs per FIG. 4 are applied at 90-1, 90-2, 90-3. Such circuitry and their logic signal control are set forth in the said patent and in my copending patent application Ser. No. 868,191 filed Oct. 21, 1969 for "Commutation Circuit for Power Inverters," assigned to the assignee hereof.

FIGS. 7A to 7D illustrate the principles of the system output waveform construction for the two-channel inverter (40). FIG. 7A corresponds to FIGS. 2 and 5, depicting reference summing transformer ST-1 with an applied line-to-line square wave voltage $E_1$ (three-phase) to its wye connected primary windings (60-). Transformer ST-1 connects to the output 57 of three-phase square wave generator (55). The line to neutral secondary waveshape ($e_1$), for the reference winding at 0° (and on a three-phase basis, with the other windings) is the eight-step waveform of FIG. 5 The primary (62-1) to respective secondary (66-1) winding ratio results in waveshape ($e_1$) with a peak magnitude $b$ indicated as at unity level 1.0, with its intermediate steps $a$ at the 0.5 level. The secondary windings (65-1) of transformer ST-1 are preferably wound close onto their respective phase primary windings (60-1) for efficient results. They are also in wye-connection as shown.

FIG. 7B shows the operation of the second summing transformer (ST-2) of the two-channel inverter (40). Its primary winding 60-2 is three-phase and is delta-connected to the three-phase square wave output (58) of generator SCR-2 (56) as shown in FIG. 2. The generator 56 signals are displaced 30° in time phase-by-phase behind those of generator 55, as shown in FIG. 8. The resultant (+) and (−) waveform ($e_2$) of the respective ST-2 secondary windings 65-2, correspond to that shown in FIG. 6 for line-to-line of the ST-1 secondary windings 65-1. The resultant waveform $e_2$ has 60° alternating blanks, and a relative magnitude of 0.866 for ($c$), for its (+) and (−) 120° sections. The said square wave voltage $e_2$ depicted in FIG. 7B corresponds to $e_1$ of the phase $\phi_1$ secondary coil 66-1 of wye transformer ST-1. Voltage $e_2$ is that across secondary winding 66-2 of delta transformer ST-2, as shown. The corresponding voltages of their $\phi_2$ and $\phi_3$ phases are respectively 120° and 240° therefrom, as will be understood. The significant phase relationship between the voltages $e_1$ and $e$ of each of the phases is that the 120° long waveforms of $e_2$ start 30° behind the reference 0° (and 180°) of $e_1$, as illustrated.

The predetermined respective time-phase displacement between the $e_1$ and $e_2$ secondary voltages is that generated between the outputs of square waveform units 55, 56. As said units are triggered by a common circuit unit (54) and clock (45), such time phase displacement is readily set up and precisely maintained as explained in my aforesaid system patent. Corresponding secondary windings are connected in voltage series-add ($e_1 + e_2$) relation, phase-by-phase, as indicated in FIG. 7C, as well as in FIG. 2. The exemplary connections are from secondary neutral point $n_1$ of ST-1, in series-add of the respective secondary windings of 60-1, 60-2, to yield resultant ($e_3$) outputs in the three phases. Similar connections are made for the three secondary winding sets of transformers ST-1 and ST-2, which with the neutral $n_1$ lead (N) provide the four-wire output 75, as will be understood. Alternatively, the neutral ($n_1$) may be arranged with the three delta channel No. 2 secondaries 62-2, 63-2, 64-2 in wye-connection, and their wye channel No. 1 counterparts series-added thereto.

Their respective output voltage resultants ($e_3$), illustrated on an instantaneous real-time basis, are the 12-step waveform of well-known effectiveness for inverter output circuits. In three- or six-phase systems such square stepped waveforms require relatively even less filtering. The optimum 12-step waveshape of output signals $e_3$ each extend across 360° in alternate (+) and (−) sections 180° each. Their peaks at $d$ are at relative magnitude 1.866, combining the $b$ and $c$ levels of signal components $e_1$ and $e_2$. The peak plateaus each extend for 60° in time, the intermediate steps being 30° Such 12-step waveshape ($e_3$) is synthesized herein in a stable, simple and direct manner in two channels with two output transformers ST-1, ST-2 of conventional polyphase construction. Corresponding waveforms with significantly larger numbers of steps can be produced directly, with even greater advantage, in versions hereof with more channels, as will be set forth.

Waveform $e_3$ is thus at each output phase of the two-channel inverter (40), each being 120° apart in time-phase. Interconnection of their secondary windings, in three-phase array with line neutral (N), is diagrammed in FIG. 2. Output cable 75 connects to the three-phase filter (42) (see FIG. 1) that removes the harmonic content of the initial stepped waveforms, providing clean polyphase output currents at the system frequency ($f_o$). FIG. 7D illustrates the resultant output in sinusoidal waveform $e_o$, for each phase. Said 12-step waveforms have no harmonics below the 11th when so combined, and in three-phase arrangement, do contain the 11th and 13th harmonic of fundamental $f_o$. In a balanced three-phase system the next harmonics that appear are the 23rd and 25th second order in magnitude. The latter are inexpensively filtered, for fundamental $f_o$ frequencies of 400 hertz or higher. Relatively small series resonant filters effectively strip out the 11th and 13th harmonic content. Higher harmonics, and radio frequency interference, are readily removed with small series chokes and parallel capacitors. The filtering unit (42) for the polyphase inverters hereof is significantly less in weight and cost, for a given power output, as compared to those required for other types of inverters or cycloinverters.

An important advantage of such series arrangement of the output windings is that for a rated output voltage, the requisite voltage from each transformer (ST-1, ST-2) need only be about one-half the final one. This results in less costly SCR$^s$ for the generators (55, 56). In effect, the result is current multiplication, for any given output power rating. The use of multichannels for the inverters hereof is economical for higher power inverter systems, as described in my aforesaid system patent.

As already mentioned, the winding construction of the respective three-phase transformers ST-1 and ST-2 is to have the same impedance or match to their respective square wave generators 55 and 56. This assumes that the 55, 56 units have the same rating, output voltage and current characteristics, waveform and impedance. A significant difference is the normally preset time-phase displacement between their respective output phases, as 30° for a two-channel system 40, as explained hereinabove in connection with FIGS. 2, 7B and 8. The interline impedances are the same at outputs 57, 58: $Z_{12}$ between phases $\phi_1$–$\phi_2$; $Z_{23}$ at $\phi_2$–$\phi_3$; $Z_{31}$ at $\phi_3$–$\phi_1$. The number of winding turns ($N_o$) used in each primary winding 62-1, 63-1, 64-1 of transformer ST-1 is selected to provide said matched impedance in their wye-connected array. To provide the same impedance matching with generator 56, the delta connected primary windings 62-2, 63-2, 64-2 each have $\sqrt{3}\cdot n_o$ turns. In this manner both generators 55 and 56 are more equally loaded with power demand by their respective transformers ST-1 and ST-2 in the operation of inverter 40 with a load across output lines (75). The SCR$^s$ of the system generators (55, 56) thereby share in output current demand substantially equally during normal, overloaded, unbalanced, and even reactive load conditions.

In further balancing of the loading between the generators 55, 56, the effective output voltage contribution from each secondary winding of both transformers ST-1, ST-2 are made to be substantially equal. Towards this end, their number of winding turns ($n'_o$) are made the same, for the configuration hereinabove set forth for their respective primary windings. Thus, if $n'_o$ of the secondaries 66-1, 67-1, 68-1 is made equal to that ($n_o$) of their primary windings, then that for the 65-2 secondaries is $n_o$ as well, wherein their primary windings (60-2) each have $\sqrt{3}\cdot n_o$ turns as aforesaid. Such respective ratios result in the relative 0.5, 1.0, 0.866, and 1.866 magnitudes for signal levels $a$, $b$, $c$, $d$ in FIG. 7, and provides the 12-step waveform $e_3$. The waveforms per $e_1$ and $e_2$ have the same effective secondary R.M.S. output voltage.

In practice, with line-to-line voltages ($E_1$) across generator terminals 57 and 58 at 200 volts, the line-to-neutral equivalent is 115 volts. With $n'_o$=$n_o$, the effective $e_1$ voltage is 115 volts, as it that for $e_2$. Their composite series-add voltage $e_3$ is twice that, an R.M.S. voltage of 230 line-to-neutral (N) at inverter (40) output terminals 75. If a 115 line-to-neutral voltage is instead desired at this output (75), the turns $n'_o$ of the transformer secondaries are made half of $n_o$, resulting in a 200 volt line-to-line level, as will be understood. The inverter system 40 hereof has these desirable characteristics: stable; balanced loading between the generators 55, 56; line voltage maintenance (75); little harmonic content with inexpensive effective filtering (42); longer life-periods and lower rated SCR$^s$ for given system output power rating; less cost and weight for the transformers and filter.

As mentioned hereinabove, more than the two channels per inverter 40 are advantageously employed for higher output power ratings. The power contribution and design-load of each generator-channel is the system output rating divided by the number of channels used, see aforesaid inverter system patent. The operational interchannel principles of the invention hereof are applicable to an even number of channels ($n$) as 2, 4, 6 ... 2$n$. Where four channels are used, the respective time-phase displacement of the square wave output of channel No. 2 with respect to that of channel No. 1 is −15° of channel No. 3, −30°; of channel No. 4, −45°. For a six-channel inverter system, such respective time-phase displacements are −10°, −20°, −30°, −40°, −50°. Their delta and wye transformer connections may be arranged in pairs, in succession. Their resultant waveforms have a correspondingly greater number of steps, thus requiring an even smaller filter structure than for a two-channel system of equivalent power rating.

The exemplary output summing transformers (ST-1, ST-2) for each channel were stated to be of conventional polyphase design and construction. This is an important advantage in that their production, weight, and cost factors may be directly controlled. No exotic material or tough design features are required herein. Thus, conventional power transformer laminations for the system frequency can be used. The interphase magnetic iron coupling and its structure in general is optional; efficient polyphase magnetic interaction being preferred. The widely used flat "open-window" E-I arrangement has been found to be practical and economical herein. Other three-phase transformer configurations may be used, as: those shown in U.S. Pat. No. 2,616,070; three C-cores joined at their open ends into a three-dimensional "Y" form; three parallel I-cores with their ends joined by laminated crossbars. Respective primary and secondary windings are wound on each leg of the three phases. The relative turns and turn-ratios for the wye and the delta channel transformers were outlined hereinabove.

What is claimed:

1. An alternating current power supply system comprising a plurality of static polyphase inverters energizable by a unidirectional current source, each of said inverters providing an individual polyphase set of alternating signal trains of generally square waveform that are in symmetrical time-phase displacement within each signal set, means for maintaining the said polyphase signal sets at a predetermined common frequency and at substantially the same signal shape, means for establishing a time-phase displacement respectively between successive of said polyphase signal sets, a polyphase output transformer individual to each of said polyphase inverters, each of said transformers effectively having primary windings in circuit connection with the output of its associated inverter, the primary windings of at least one of said transformers being in wye-connection, those of at least a second of said transformers being in delta-connection, an individual secondary winding magnetically coupled with each of the said transformer primary windings, and circuit means connecting in series-add relation respective secondary windings that contain related signal trains among the polyphase output signal sets to form separate output-phase groups that establish a common polyphase power output for the alternating current system.

2. A power supply system as claimed in claim 1, containing only two polyphase signal inverters, the output of one of said inverters being connected with said wye-connected transformer, the other inverter output being connected with said delta-connected transformer, and the respective signal sets of the two inverters being in time-phase displacement in the order of 30°.

3. A power supply system as claimed in claim 1, in which the respective primary windings of said delta- and wye-connected transformers are proportioned to present an effective line-to-line impedance that substantially matches that between the output lines of their respective connected polyphase inverter.

4. A power supply system as claimed in claim 2, in which the respective primary windings of said delta- and wye-connected transformers are proportioned to present the same effective line-to-line impedance, and which impedance substantially matches that between the output lines of their respective connected polyphase inverter.

5. An alternating current power supply system comprising a plurality of static three-phase inverters energizable by a unidirectional current source, each of said inverters providing an individual set of three-phase alternating signal trains of generally square waveform that are in symmetrical time-phase displacement within each signal set, means for maintaining the said three-phase signal sets a predetermined common frequency and at substantially the same signal shape, means for establishing a predetermined time-phase displacement respectively between successive of said three-phase signal sets, a three-phase output transformer individual to each of said inverters, each of said transformers effectively having primary windings in circuit connection with the output of its associated inverter, the primary windings of at least one of said transformers being in wye-connection, those of at least a second of said transformers being in delta-connection, an individual secondary winding magnetically coupled with each of said transformer primary windings, and circuit means connecting in series-add relation respective secondary windings that contain related signal trains among the three-phase output signal sets to form separate output-phase groups that establish a common three-phase power output for the alternating current system.

6. A power supply system as claimed in claim 5, containing two three-phase signal inverters, the output of one of said inverters being connected with said wye-connected transformer, the other inverter output being connected with said delta-connected transformer, and the respective signal sets of the two inverters being in time-phase displacement in the order of 30°.

7. A power supply system as claimed in claim 5, in which the respective primary windings of said delta- and wye-connected transformers are proportioned to present an effective line-to-line impedance that substantially matches that between the output lines of their respective connected three-phase inverter.

8. A power supply system as claimed in claim 6, in which the respective primary windings of said delta- and wye-connected transformers are proportioned to present the same effective line-to-line impedance, and which impedance substantially matches that between the output lines of their respective connected three-phase inverter.

9. A power supply system as claimed in claim 8, wherein both said inverters have substantially the same power rating and line-to-line output impedance, and each said primary winding of the delta-connected three-phase transformer has $\sqrt{3}$ times the number of turns of each said primary winding of the wye-connected transformer.

10. A power supply system as claimed in claim 8, in which said transformers are wound with respective primary to secondary winding turn ratios that provide secondary winding output voltages having substantially the same root-mean-square voltage level, whereby each said series-add output-phase group has its windings contribute power equivalently.

11. A power supply system as claimed in claim 9, wherein each of the transformer secondary windings have the same number of turns and thereby substantially the same root-mean-square output voltage level, whereby both said inverters equally divide the output power demands on the system.

* * * * *